United States Patent [19]

Henke et al.

[11] Patent Number: 5,179,927
[45] Date of Patent: Jan. 19, 1993

[54] INJECTION-TYPE COMBUSTION ENGINE WITH ELECTRIC SPARK IGNITION AND A HEATING SYSTEM

[75] Inventors: Jürgen Henke, Wernau; Erwin Spinner, Leinfelden; Peter Früh, Weinstadt, all of Fed. Rep. of Germany

[73] Assignee: Mercedes-Benz AG, Fed. Rep. of Germany

[21] Appl. No.: 767,903

[22] Filed: Sep. 30, 1991

[30] Foreign Application Priority Data

Sep. 28, 1990 [NL] Netherlands ............ 9002129

[51] Int. Cl.$^5$ ............................................ F02M 31/00
[52] U.S. Cl. ....................................................... 123/549
[58] Field of Search ............... 123/549, 547, 557, 552, 123/543

[56] References Cited

U.S. PATENT DOCUMENTS

| | | | |
|---|---|---|---|
| 3,930,477 | 1/1976 | Jordan | 123/549 |
| 4,350,134 | 9/1982 | Sparks | 123/549 |
| 4,967,706 | 11/1990 | Van Wechem et al. | 123/549 |
| 5,007,402 | 4/1991 | Scherenberg | 123/549 |
| 5,048,500 | 9/1991 | Curhan | 123/549 |
| 5,056,495 | 10/1991 | Yamashita et al. | 123/549 |
| 5,086,747 | 2/1992 | Curhan | 123/549 |

FOREIGN PATENT DOCUMENTS

| | | | |
|---|---|---|---|
| 0453927 | 10/1991 | European Pat. Off. | 123/549 |
| 3426469 | 5/1986 | Fed. Rep. of Germany . | |
| 3921739 | 11/1990 | Fed. Rep. of Germany . | |
| 2567965 | 1/1986 | France . | |
| 0219446 | 2/1985 | Japan | 123/547 |
| 6155256 | 3/1986 | Japan . | |
| 6155357 | 3/1986 | Japan . | |

Primary Examiner—Noah P. Kamen
Attorney, Agent, or Firm—Evenson, Wands, Edwards, Lenahan & McKeown

[57] ABSTRACT

The invention relates to an injection-type combustion engine having an air intake duct for each cylinder, a fuel injection valve and a heating element arranged downstream of it in the air intake duct.

In order to achieve a simple installation for the heating element, the cylinder head has an opening through which the heating element can be inserted such that its heat sink is arranged to be largely self-supporting in the cross-section of the air intake duct.

3 Claims, 2 Drawing Sheets

INJECTION-TYPE COMBUSTION ENGINE WITH ELECTRIC SPARK IGNITION AND A HEATING SYSTEM

BACKGROUND OF THE INVENTION

This invention relates principally to an injection-type combustion engine with electric spark ignition which comprises at least one cylinder equipped with an air intake duct, at least one intake valve provided in the cylinder head, at least one fuel injector, and a heating element mounted downstream of this injector and having a heat sink and one or several PTC-pellets mounted on it.

A combustion engine of this type is known from the German Patent Document DE-C-34 26 469 and from the Dutch Patent Document NL-A-8801334.

It was found that of the total exhaust gas emission approximately 50% occurs during the short time period in which the engine has not yet reached its operating temperature. Even exhaust gas catalysts which, under normal conditions, reduce the amount of exhaust gas by approximately 90% do not reach this degree of conversion before the operating temperature of the catalyst has been reached. The conversion starts at a temperature of approximately 300° C. so that, after a cold start, the exhaust gas emission of the engine in a catalyst is not reduced or hardly reduced. Since the temperature level is not high enough for evaporating the fuel (gasoline or alcohol), an additional amount of fuel must be supplied when the engine is cold in order to obtain a combustible mixture. This leads to a high exhaust gas emission. Therefore, when the engine temperatures are low, the fuel consumption and the exhaust gas emission are relatively high. By the preheating of fuel / air mixture, a considerable amount of fuel is therefore also saved because less fuel or no additional fuel is injected. In the case of the initially mentioned combustion engine, the fuel is sprayed onto the heating element which is brought to the desired temperature within a very short time and in the process is also brought to the desired temperature. As a result, the fuel will evaporate better, and a better mixture with the combustion air is also obtained. The heating element is switched off when the engine is warm enough to take over the evaporation of the fuel.

In the case of the engine known from the mentioned German Patent Document DE-C-3426469, the heating element has the form of a pipe which projects into the intake duct of the cylinder and is surrounded by an insulating pipe. The pipe and the insulating pipe are provided with an edge flange, the edge flanges being situated in a recess of the cylinder head and being fixed by the air intake pipe. This construction has the problem that the mounting and exchanging of the heating element is a time-consuming operation. The same problem exists in the case of the engine according to the Dutch Patent Document NL-A-8801334 where the heating element is integrated in a plate which is clamped in between the intake duct and the head of the cylinder.

SUMMARY OF THE INVENTION

It is an object of the invention to avoid this problem and to provide an engine of the initially mentioned type in which the heating element can easily be mounted and exchanged and in which, in the case of a multi-cylinder engine, the heating elements can be exchanged for each cylinder. The invention also has the object of improving the transmission of the heat from the heat sink to the fuel.

According to the invention, the initially mentioned injection-type combustion engine for this purpose is characterized in that the heating element is mounted through an opening in the wall of the cylinder head or of the air intake duct such that the heat sink projects into the fuel mixture intake duct.

In order to achieve an excellent heat yield without significantly increasing the flow resistance of the air flow, the heat sink is provided with one or several fins which extend approximately in parallel to the air intake flow and at an angle with respect to the intake fuel flow.

The invention is extremely well suited for an injection-type engine with two intake valves per cylinder, in which case a dividing wall divides the intake pipe for the fuel into two halves which each lead to an intake valve. In the case of an engine of this type, there exists the danger that in the cold condition the fuel condenses on the cold dividing wall. This danger is avoided according to the invention by inserting the heat sink into the profile of the dividing wall just in front of this dividing wall.

The invention will now be explained in detail by means of the figures.

DETAILED DESCRIPTION OF THE FIGURES

Figure 1:
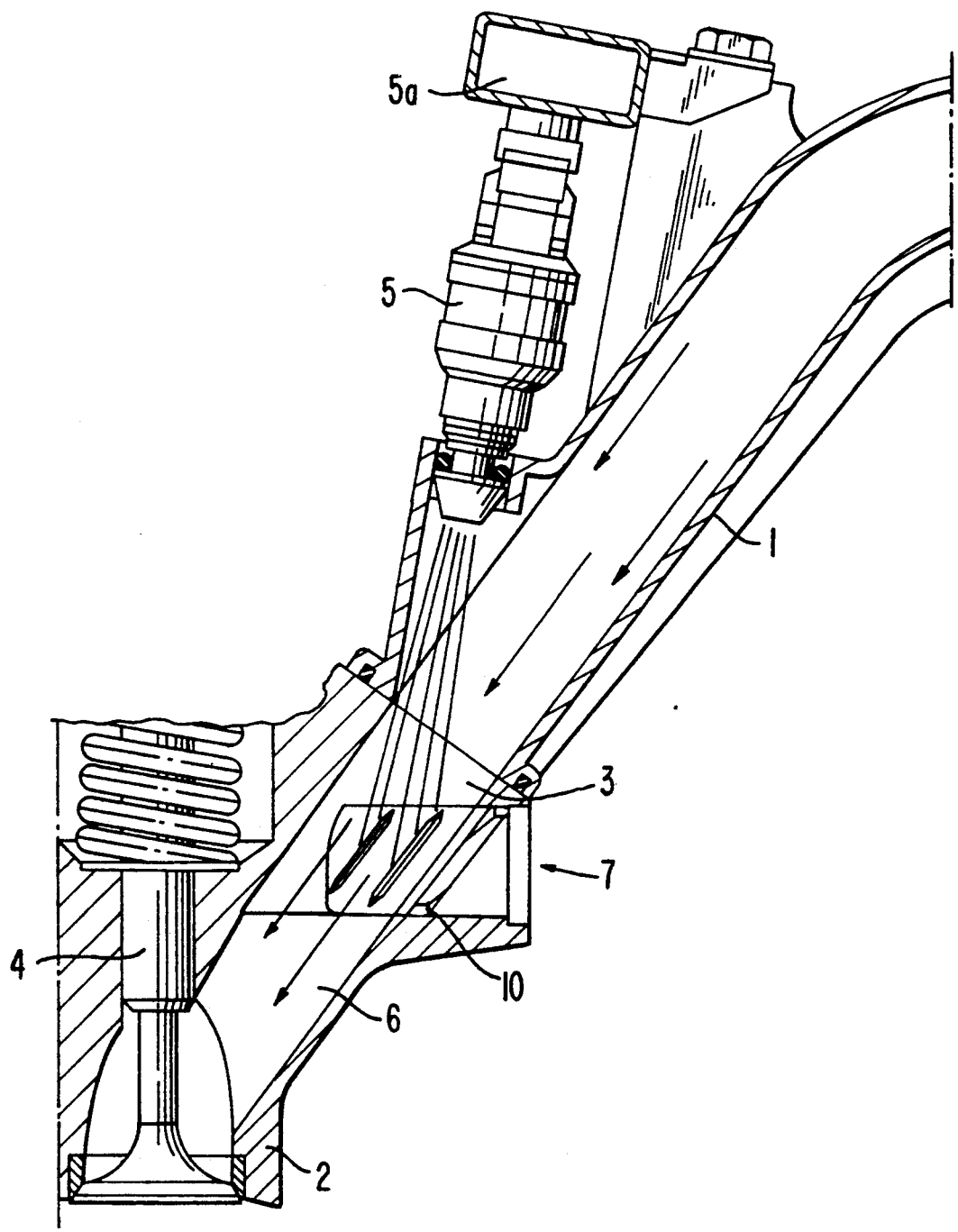
FIG. 1 is a sectional view of the part of a combustion engine according to the invention.
Figure 3:
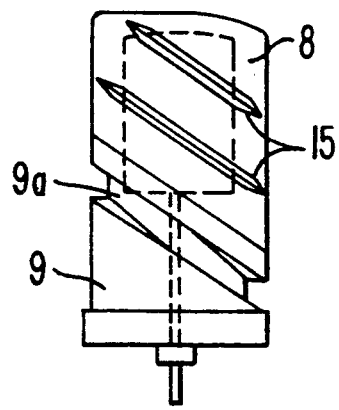
FIG. 3 is a view of the heating element.
Figure 2:
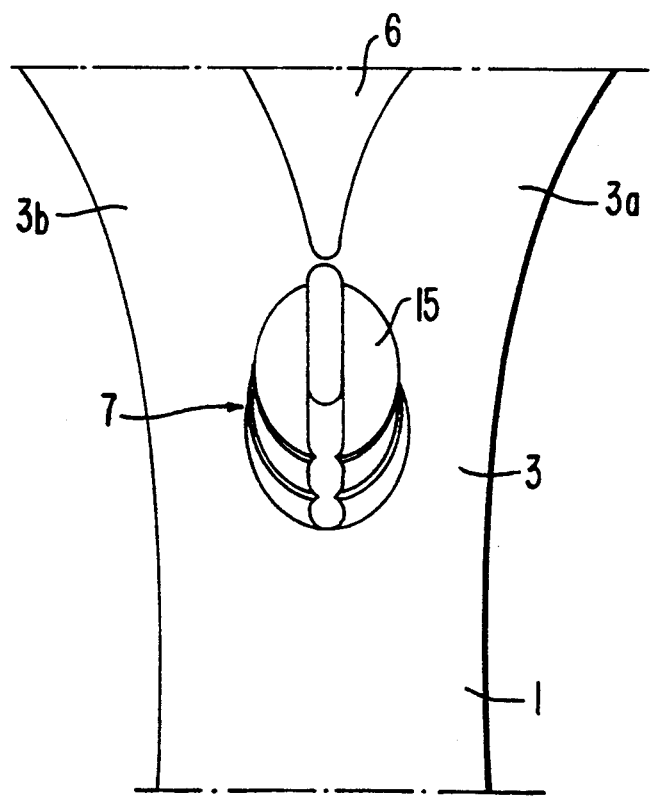
FIG. 2 is a top view of the heating element and of the dividing wall in the fuel/air mixture duct, the interior surface of the intake ducts for air and the fuel being represented by uninterrupted lines.

The part of an injection-type engine illustrated in FIGS. 1 and 2 comprises an air intake duct 1 which is fastened to a cylinder head 2 such that it connected to a duct 3 in order to inject a fuel/air mixture by way of two intake valves 4 into the cylinder.

An injector 5 for the injection of the fuel which is connected to a fuel feeding duct 5a is fastened to the air intake duct 1.

A dividing wall 6 is cast into the duct 3 and, as illustrated in FIG. 2, ends in a wedge shape in the upstream direction and divides the duct 3 into two partial ducts 3a, 3b.

In order to bring the fuel to the desired temperature when the engine is cold, this fuel is sprayed onto a heating element 7 during the injection. This heating element 7 projects through an opening in the cylinder head into the duct 3. It is not impossible that the heating element 7 projects into the air intake duct 2 through an opening, naturally at a point where the injected fuel comes in contact with the element 7.

The heating element 7 comprises a heat sink 8 in the form of a hollow flat box which is arranged in the profile of the dividing wall 6 just in front of its upstream end, and has PTC-pellets 11 associated therewith.

On the exterior side of the flat heat sink box, two oblique fins 15 are cast on which, as illustrated in FIG. 1, in the mounted condition of the heating element, extend in parallel to the air flow direction indicated by the arrows. However, the feeding direction of the injected fuel extends so obliquely with respect to the fins 15 that the fuel is sprayed onto the fins. As a result, it is achieved that the heat transmission from the heat sink 8 to the fuel takes place very efficiently without significantly increasing the resistance against the air flow.

Additional advantages of the described construction are that the heating element can be manufactured in a simple and cost-effective manner and can be mounted and exchanged very easily.

Variants are possible within the scope of the invention. The invention is also applied to an engine having a single intake valve for each cylinder but it is particularly advantageous in the case of an engine with two intake valves for each cylinder.

We claim:

1. An injection-type combustion engine with electric spark ignition, comprising at least one cylinder head provided with an air intake duct, at least one intake valve provided in the cylinder head, at least one fuel injector, and a heating element mounted downstream of the at least one fuel injector as viewed in a direction of intake air flow and having a heat sink configured as a hollow flat box and at least one PTC-pellet associated therewith, wherein the heating element is inserted through an opening in a wall of the air intake duct so as to project into the air intake duct such that a wall of the box configured heating element extends transversely with respect to the intake air flow and has at least one fin projecting away from the box configured heating element to extend substantially in parallel to the intake air flow in the air intake duct and having a surface facing the fuel injector such that the fuel is sprayed onto the surface of the fins facing the fuel injector.

2. A combustion engine according to claim 1, having two intake valves per cylinder, one dividing wall dividing the fuel mixture intake pipe into two halves which each lead to an intake valve, and the heating element is situated in the profile of the dividing wall just in front of this dividing wall as viewed in the direction of the intake air flow.

3. A combustion engine according to claim 1, the at least one fin is arranged on the exterior side of the heating element.

* * * * *